United States Patent Office 3,506,072
Patented Apr. 14, 1970

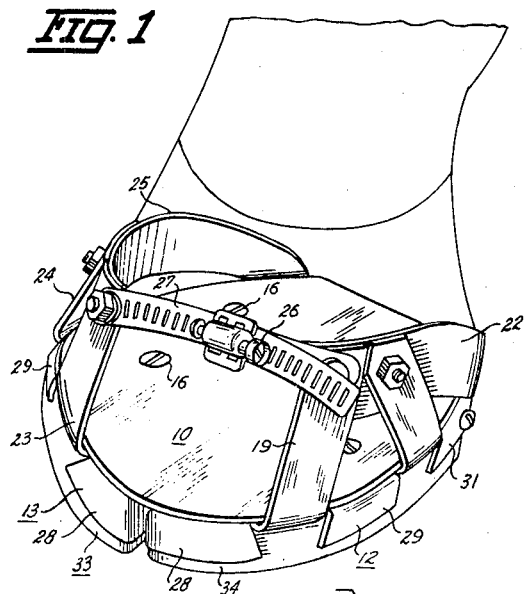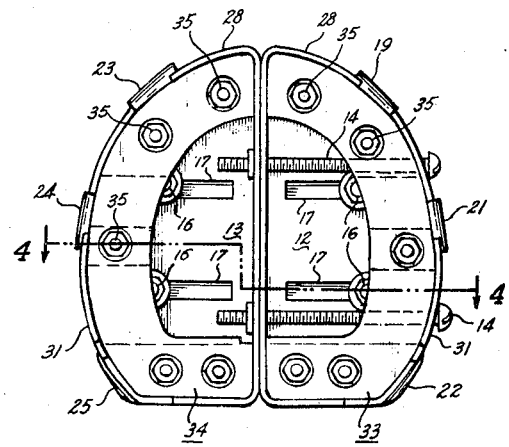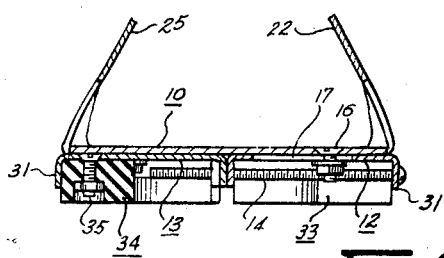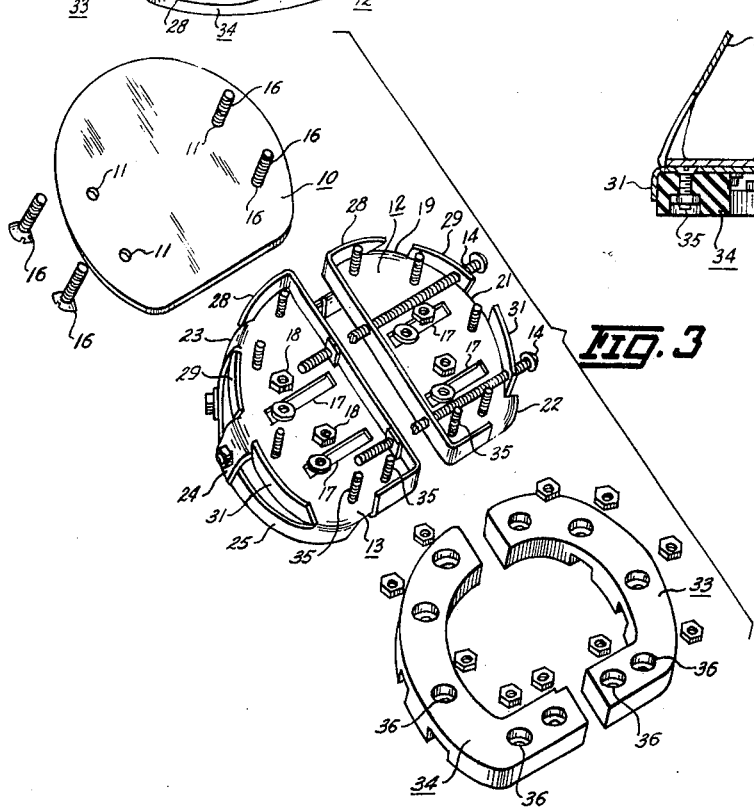

3,506,072
HORSE SHOES
Walter O. McFarland, 1114 May St., Marshalltown, Iowa
50158, and Wilbur Lyle Buschbom, Prairie du Chien,
Wis. 53821
Filed Sept. 13, 1967, Ser. No. 667,541
Int. Cl. A01l 7/02
U.S. Cl. 168—13    4 Claims

ABSTRACT OF THE DISCLOSURE

A lightweight bolt-on horse shoe having a pair of adjustable complimentary cup-like members for enclosing the hoof and also forming, on the underside, a receptable for a variety of hoof pads to meet the varying use demands. The device includes a support plate for supporting the weight of the animal and also for joining the cup-like side members. Included is a means for drawing the sides together.

---

This invention relates to horse shoes and has particular relation to a bolt-on horse shoe which may be employed for a large range of hoof sizes and for accommodating surface-contacting pads for use on varying surfaces.

Because of the difficulty of finding a blacksmith who can do horseshoeing, the desirability of a bolt-on type of horse shoe is quite obvious. However, it is a still further fact regarding riding horses that it is desirable to provide a horse shoe with changeable pads so that the horse may be ridden over varying surfaces. For instance, in an exhibition hall a pad which would not scar the surface but which would cling to the surface would be desirable. For use on ice another pad would be desirable. On pavement still another pad might be suitable.

It is therefore one of the objects of our invention to make a bolt-on type of horse shoe which may be readily adjusted for gripping the hoof to the desired degree.

Another object is to provide a bolt-on type of horse shoe which may be used on different sizes of hoofs.

A still further object of our invention is to provide a bolt-on horse shoe structure that has incorporated in it a pad and pad receiving means in which the pad can be readily changed.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of a horse shoe constructed according to a preferred embodiment of our invention, with the hoof and ankle of the horse indicated in outline.

FIGURE 2 is a bottom plan view of the shoe as it appears with the two halves fully drawn together.

FIGURE 3 is an exploded view of the various parts of the horse shoe, including the plate, the two side members right and left, and the pads, and FIGURE 4 is a view in section taken along the lines 4—4 of FIGURE 2.

Referring then to the drawings:

A preferred embodiment of our bolt-on horse shoe is constructed of four parts. One is a plate illustrated generally at 10 and having holes in it as at 11 to which the balance of the main parts or main frame of the horse shoe are bolted. This plate is applied directly against the bottom of the horse's hoof and the horse's hoof rests upon this plate.

The side members are confining members for confining the hoof, and they extend over the bottom of the plate as illustrated at 12 and 13. These confining means may be considered as consisting of two approximately semi-circular members 12 and 13, each having at least three upwardly extending tongues or strips with the part 12, for instance, having tongues 19, 21 and 22 which are bent upwardly as shown in FIGURE 1, and the part 13 having tongues 23, 24 and 25 also bent upwardly.

These tongues or lugs are brought together and riveted or bolted as shown in FIGURE 1 and FIGURE 3. The left semi-circular member 12 having upwardly extending lugs 19, 21 and 22 has a lug or strip extending upwardly and forwardly so that it may be engaged by the upper ends of lugs 19 and 21.

In the same manner the right semi-circular member 13 is provided with two upwardly extending lugs 23 and 24 extending approximately vertically except for the inclination of horse's hoof, and 24 extending slightly forwardly, and 25 extending upwardly and forwardly to engage the upper ends of the lugs or strips 23 and 24. The tongues on each side are thus brought together and riveted as illustrated more particularly in FIGURE 1 to form the two parts of an enclosure for the upper surface of the hoof, and these two halves are adjustably mounted on the hoof first by means of securing the bolts 16 on the two halves of the main frame to form a platform.

Through bolts 14 draw the two halves of the cage-like confining means together, and then the bolts 16 which pass through slotted openings 17 in the two half-moon plates 12 and 13 are tightened with regard to the plate 10. This is done either by adjusting them in place with the horse shoe removed, or by tightening on the nuts 18 on the bottom of the plates. The slots 17 permits movement of the halves together to accommodate them to the horse's hoof.

Further adjustment of the two halves and drawing them together is accomplished by means of the adjusting screw 26 which pulls in or releases the ladder-like strip 27 to draw the tops of the two halves together or release them.

The half-moon plate 12 is provided with downwardly extending lugs at 28, 29 and 31 which, together with like lugs 28, 29 and 31 on the other half-moon plate, form an enclosure for the two halves 33 and 34 of a pad.

Bolts are provided as at 35 which extend through suitable openings 36 in the pads 33 and 34, so that the pads may be securely fastened within the confines of the downwardly extending lugs and the underside of the half-moon plates.

These pads 33 and 34 may be of any desired material suitable for the surface on which the animal is to walk, such as for instance Neoprene plates might be provided for walking on finished wood floors or pavement, or steel plates might be employed for cross-country riding.

Although we have described a specific embodiment of our invention, it is apparent that modifications thereof may be made by those skilled in the art. Such modifications may be made without departing from the spirit and scope of our invention.

We claim as our invention:

1. A clamp on horse shoe including two complementary approximately semi-circular plates provided with downwardly projecting flange means having openings to receive at least one transverse fastener, at least one fastening bolt passing through said openings provided in said flanges for bolting the plates together, upwardly by projecting straps integrally formed with the plates and adapted to pass over the sides of a hoof, means securing the straps together for fastening the two part complementary semi-circular plate structure in place of the underside of the hoof and a semi-circular pad secured with an underside of each plate.

2. A clamp on horse shoe as set forth in claim 1 in which said downwardly projecting flanges, of the semi-circular plates provide two complementary plate cavities for positioning said semi-circular pads, the plates and pads having bolt holes and bolts for bolting the pads in the cavities.

3. A clamp on horse shoe as set forth in claim 1 in which said means securing the straps together includes a connecting strap with an adjustable fastening means.

4. A clamp on horse shoe as set forth in claim 1 in which a unitary plate means is secured on an upper side of the adjoining semi-circular plates by bolts extending through the unitary plate means and the semi-circular plates for holding said semi-circular plates together in an assembly.

References Cited

UNITED STATES PATENTS

| 1,057,957 | 4/1913 | Gummersback | 168—18 |
| 1,337,194 | 4/1920 | Capewell | 168—21 |
| 1,435,169 | 11/1922 | Lysiak | 168—19 |
| 1,710,909 | 4/1929 | Watson | 168—22 |

HUGH R. CHAMBLEE, Primary Examiner

U.S. Cl. X.R.

168—19